United States Patent [19]

Dale

[11] Patent Number: 5,445,539
[45] Date of Patent: Aug. 29, 1995

[54] ELECTRICAL WIRING DEVICE FOR POWER CONTROL WITH LOW VOLTAGE INPUT

[75] Inventor: James L. Dale, Lawrenceville, Ga.

[73] Assignee: The Whitaker Corporation, Wilmington, Del.

[21] Appl. No.: 303,911

[22] Filed: Sep. 9, 1994

[51] Int. Cl.⁶ .......................................... H01R 13/70
[52] U.S. Cl. ...................................... 439/535; 174/53
[58] Field of Search ............................... 439/535–539; 174/48, 53

[56] References Cited

U.S. PATENT DOCUMENTS

| Re. 33,504 | 12/1990 | Yuhasz et al. | 307/115 |
|---|---|---|---|
| 3,371,149 | 2/1968 | Maxted | 174/53 |
| 3,472,945 | 10/1969 | Trachtenberg | 174/53 |
| 4,649,323 | 3/1987 | Pearlman et al. | 315/307 |
| 4,889,999 | 12/1989 | Bowen | 307/31 |
| 5,064,386 | 11/1991 | Dale et al. | 439/535 |
| 5,101,078 | 3/1992 | Yang | 174/48 |
| 5,122,069 | 6/1992 | Brownlie et al. | 439/535 |
| 5,170,068 | 12/1992 | Kwiatkowski et al. | 307/31 |
| 5,191,265 | 3/1993 | D'Aleo et al. | 315/295 |
| 5,237,207 | 8/1993 | Kwiatkowski et al. | 307/31 |

OTHER PUBLICATIONS

Home Works Integrated Lighting Control System; Feb. 1994; by Lutron; 21 pages.
GE Wiring Devices; Apr. 1989; 19 pages.
1993 National Electric Code Handbook; 13 pages.

Primary Examiner—Gary F. Paumen
Attorney, Agent, or Firm—Katherine A. Nelson

[57] ABSTRACT

The electrical wiring device 20 for power control having low voltage input includes a first electrical connection element 46 for interconnection to conductors in a first group, a second electrical connection element 50 for interconnection to conductors in a second group, a mounting strap 52 for mounting the wiring device 20 in an electrical device box 84, a housing 22 in which the first electrical connection element 46 is located, and a tubular projection 32 mountable on the housing 22, the projection 32 separating the conductors in the first group from the conductors in the second group. The first group of conductors includes power-limited Class 2 and Class 3 conductors. The second group includes electric light, power, Class 1, or non-power limited fire protection signaling conductors.

12 Claims, 5 Drawing Sheets

ELECTRICAL WIRING DEVICE FOR POWER CONTROL WITH LOW VOLTAGE INPUT

FIELD OF THE INVENTION

This invention is directed to an electrical wiring device for power control and more specifically to a wiring device activated by signals transmitted over low voltage wires.

BACKGROUND OF THE INVENTION

Home automation or management systems which permit increased control of at least some of the electrical subsystems in a dwelling have begun to replace or to supplement conventional wiring systems. These systems can provide automatic control of or can provide increased user control options for such systems as electrical power and lighting, heating ventilation and air conditioning, audio/video home entertainment systems, security systems, telecommunications equipment, and landscape maintenance systems such as automatic lawn sprinklers.

Many home control systems and lighting control systems or subsystems are generally incompatible with conventional wiring techniques. One common complaint is that the additional wiring required for such system results in a maze of additional wiring. The systems also tend to be relatively expensive. It is desirable, therefore, to have a wiring device that is compatible with existing wiring, and requires only the addition of easy to install low voltage wiring during initial construction. One such system is disclosed in U.S. patent application Ser. No. 08/303,985 in the name of Charles Winterble and filed concomitently herewith.

Another example of a lighting control system is the remote control low voltage switching system manufactured and sold by General Electric. Components of this system include transformers or power supplies, relays and remotely positioned low voltage switches. The relays include a split low-voltage coil to switch a line voltage contact armature between the on and off positions. These relays are mechanical latching type relays which are switched by momentary 24 volt rectified AC switch circuit pulses. A class 2 transformer supplies 24 volt DC current to the switching circuit of the relay and one or more remotely located low voltage switches can be used to switch each relay. The relays are discrete components which can be mounted in an electrical wall box. Similarly the switches are discrete components. Each relay has line voltage screw terminal located on the main body of the relay and class 2 control leads extending from the top of a tubular housing containing the relay coil. This relay can be mounted in one of the round knockouts of an electrical box with the tubular housing extending through the knockout hole. The connection between these leads and the class two wiring would be made using conventional wirenuts of quick disconnect terminals on the exterior of the device box. Typically several relays are placed in the same central location. The low voltage switches used to provide a momentary input to the relays are remotely located relative to the relay which they control. For example, if five relays are wired in parallel with the power supply, the maximum switch leg between a switch and a relay would be 240 feet, assuming that 20 AWG control wiring is used.

Another example of a lighting control system which uses low voltage remote control for switching lighting fixtures is the system disclosed in U.S. Pat. No. 5,191,265. A commercial version of that device is the Grafik Eye 3000 and 4000 Series Preset Dimming Controls manufactured and sold by Lutron Electronics Co., Inc. Grafik Eye is a trademark of Lutron. Versions of that device can be mounted in two, three, or four gang electrical device boxes. Two banks of screw terminals are located on the rear of that device. One bank is used to connect the device to a source of line voltage and to loads. The other bank can be connected to low voltage remote controls. Apparently because of the size of that device and the use of multigang boxes, the line voltage and low voltage lines can be sufficiently separated.

In accordance with the National Electric Code (NEC), electrical conductors including electric light, power, class 1, or non power-limited fire protection signaling conductors must be separated from electrical conductors including power-limited class 2 or class 3 conductors. For purposes of this disclosure the power limited conductors will be collectively referred to as the first group of conductors and the class 1 and related conductors will be collectively referred to as the second group of conductors. The conductors of class 2 and class 3 or first group circuits cannot be in any cable, cable tray, compartment, enclosure, outlet box, raceway, or similar fitting with conductors from the second group conductors.

In accordance with the NEC conductors of the first group in cables, cable trays, enclosures, and raceways shall not be placed in any cable, cable tray, enclosure, or raceway or similar fitting with conductors of the second group. One exception to this is where the conductors of the different groups are separated by a barrier. Another exception is conductors and compartments or enclosures, outlet boxes or similar fittings where the first group of conductors are introduced solely to connect to the equipment connected to the first group of conductors.

The NEC further requires that all joints, connections and splices of electrical cables must be made inside an approved enclosure and further must include tight connections with the conduit or cable. Conventional electrical boxes may be made from metal or plastic. The box is further designed with great flexibility so that wires can be brought in from any side by removing a "knock out" to receive a lug for mounting fixtures or the like. In accordance with the present invention, the electrical box needs to include a knock out in the back of the box and additionally needs to be of sufficient depth to accommodate the wires of either a conventional device or a smart device.

While metal boxes are suitable for use with metallic or nonmetallic cable and conduit, nonmetallic boxes may only be used with nonmetallic cable and conduit. Plastic, polyvinyl chloride and fiber glass boxes are particularly popular as is the use of nonmetallic cable such as (NM, or NMC), commonly referred to as Romex cable. A grounding wire is also used with nonmetallic cable to provide proper grounding through the system. Nonmetallic boxes offer additional flexibility in that the material can be readily drilled to provide a cable receiving hole of the proper diameter at any desired location.

The present invention is designed to be compatible with the wires in a standard three way switch system having hot, neutral, switched hot and ground wires. In connecting the smart switch, the corresponding wires are interconnected with wire nuts. The remote control data wires are then connected to the stored remote control wires. It can be recognized from the standard three way wire system that having two power cables each with essentially four wires gets rather crowded when assembling the switch or device in the box. It is therefore necessary in accordance with NEC to have the barrier between the remote control data wires to have the required separation between the group 1 and group 2 wires. The three way wiring system allows a light or other devices to be switched on and off at more than one location. The same capability can be provided by using the smart wiring device which can be switched at the immediate location or from a remote control box via the data wire.

SUMMARY OF THE INVENTION

The present invention is directed to an electrical wiring device having a first electrical connection element for interconnection to conductors in a first group, a second electrical connection element for interconnection to conductors in a second group, a mounting strap for mounting the wiring device in an electrical device box, a housing in which the first electrical connection element is located, and a tubular projection mountable on the housing, the projection separating the conductors in the first group from the conductors in the second group. The first group of conductors includes power limited Class 2 or Class 3 conductors. The second group of conductors includes electric light, power, Class 1, or nonpower-limited fire protection signaling conductors. The wiring device in accordance with the invention is used with an electrical box having an opening extending through the rear face of the electrical device box such that the conductors in the first group can be fed from the electrical box and through the tubular projection and interconnected to corresponding conductors of the device. In the preferred embodiment the tubular projection extends over the first electrical connection element and acts as a barrier between the conductors of the first group and the conductors of the second group.

It is an object of the present invention to provide a wiring device adapted to be mounted in standard electrical device boxes that has capability of interconnecting conductors carrying power and also for connecting low voltage wires from a remote device while maintaining a barrier between the power and low voltage conductors.

It is a further object of this invention to provide a wiring which can be used without requiring significant space in the electrical device box.

It is a still further object of this invention to provide a wiring device which does not unnecessarily limit the number of power conductors which can be used in an electrical device box, both with respect to practical installation and to the number of conductors which may be used under the National Electric Code.

An ancillary object of this invention is to provide a wiring device which can be used with a standard installation in which a switch controls one load and to provide a wiring device which is also compatible with three way wiring.

A further object of this invention is to provide a wiring device which is compatible with conventional electrical wiring installations, including the use of non-metallic sheathed cable such as NM or NMC cable.

Furthermore it is of course necessary that his device be compatible with applicable codes, including most particularly the National Electric Code.

Embodiments of the present invention will now be described by way of example with reference to the accompanying drawings.

BRIEF DESCRIPTION OF THE DRAWINGS

FIG. 3 is a rear view of the wiring device with the tubular projection portion exploded therefrom.

FIG. 4 is a cross-sectional view of a conventional wiring box mounted in a wall and having the signal wires prewired and secured in a wire management knockout closure extending from the rear of the box.

FIG. 5 illustrates the signal wires pulled into the box and through the tubular projection of the present invention for interconnection to signal connectors of the device and the power wires connected.

FIG. 6 illustrates the device inserted into the wall box with the power and signal wires interconnected, the tubular projection providing the requisite barrier between the power conductors and low voltage conductors.

FIG. 9 shows an alternative embodiment of the signal wires being held at the rear of a convention wire box in a wall.

DETAILED DESCRIPTION OF THE EMBODIMENT

Figure 1:
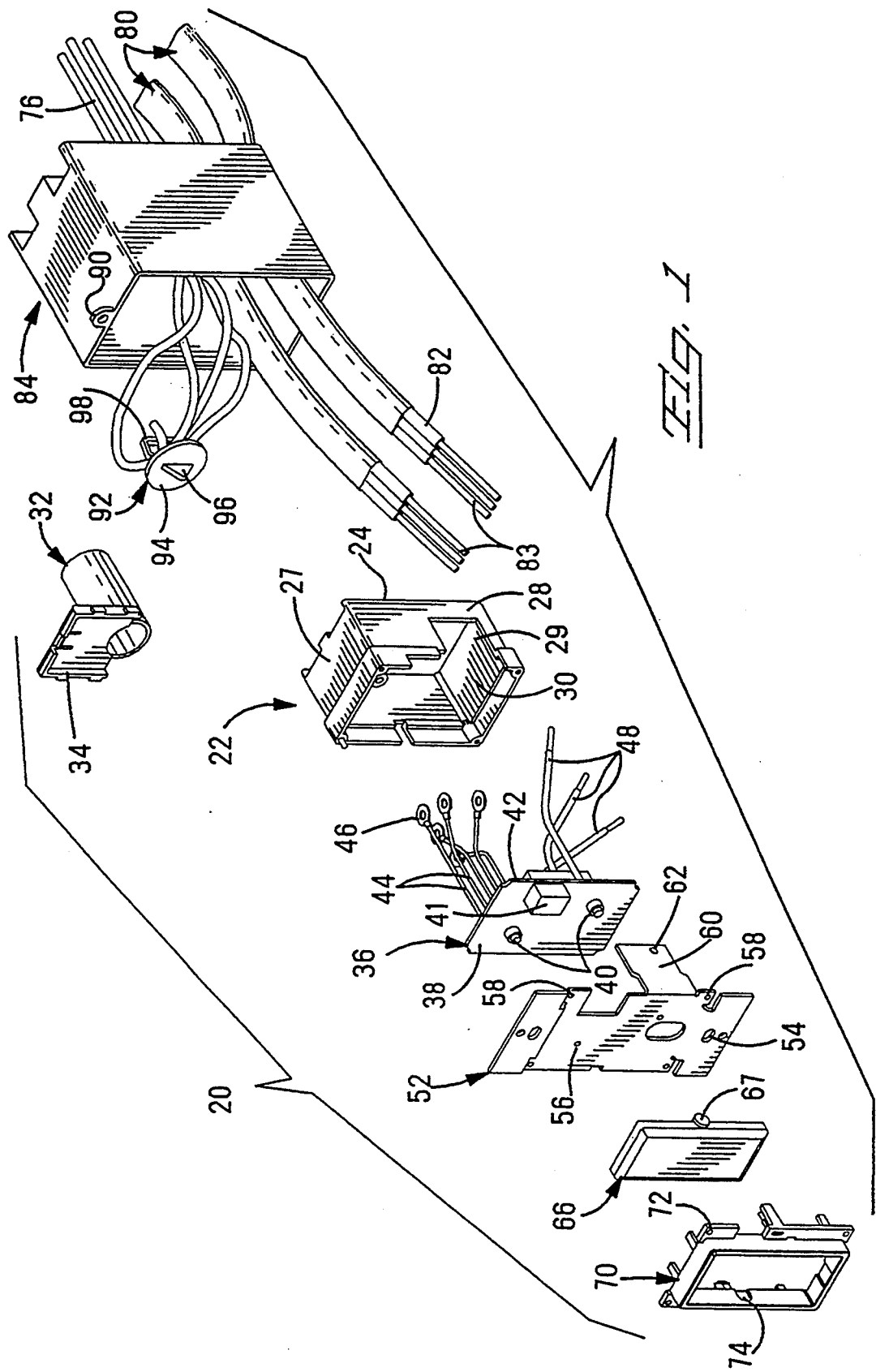
FIG. 1 is an exploded perspective view of the wiring device of the present invention prior to installation in a conventional wall box.

The present invention is directed to an electrical wiring device 20 mountable in a conventional electrical device box 84 secured in a wall (not shown). The electrical wiring device includes first and second connection elements 46,50 for interconnecting two groups of conductors to respective conductors of another electrical device. The first group includes power limited Class 2 or Class 3 conductors 76 and the second group includes electric light, power, Class 1, or nonpower-limited fire protection signaling conductors 82. The wiring device 20 is activated by signals transmitted over the low voltage wires 76 from a remote device. For purposes of illustrating the invention the wiring device 20 is shown as a rocker operated switch used for example to control lights.

This switch of the preferred embodiment can be an on/off switch using a relay to switch a 120 volt AC-15 Ampere load, such as a lighting fixture or a receptacle outlet. The switch of the preferred embodiment can also be a dimmer switch employing a triac to control a lighting fixture. Either the relay or the triac is activated by a low voltage driver circuit. For the relay, this low voltage circuit drives the relay coil. For the triac, a gate signal current control the current transmitted between the main terminals of the triac.

In the preferred embodiment of this invention, the power limited circuit or circuits which are used to provide the signals to control either the relays or triacs can be electrically isolated by employing optoisolators on the wiring devices. Thus the power limited conductors are not affected by the greater potentials and currents which may be present on printed circuit boards or other components of the wiring devices. Alternatively isolation may be provided by using discrete components such as resistors to limit the potential and current which can be supplied to a low voltage circuit by the wiring device.

Figure 4:
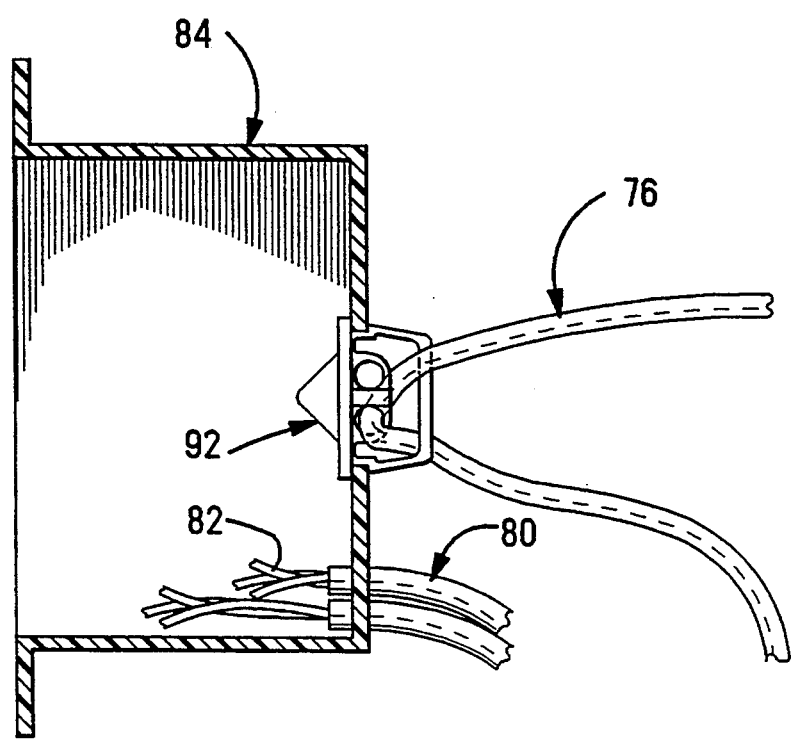
FIGS. 4 through 6 illustrate the means for upgrading a standard device box to the wiring device of the present invention.
Figure 5:
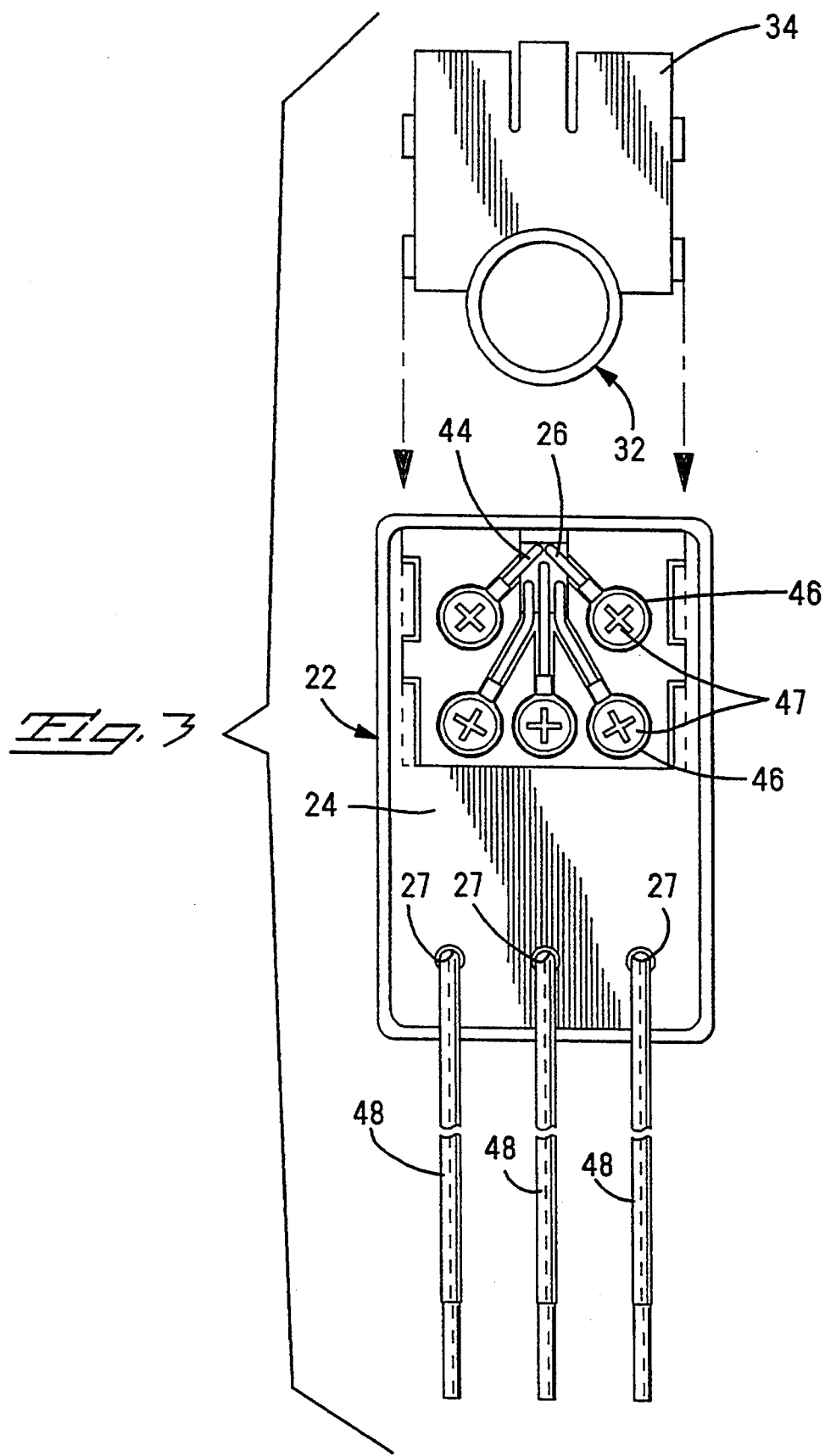
Figure 6:
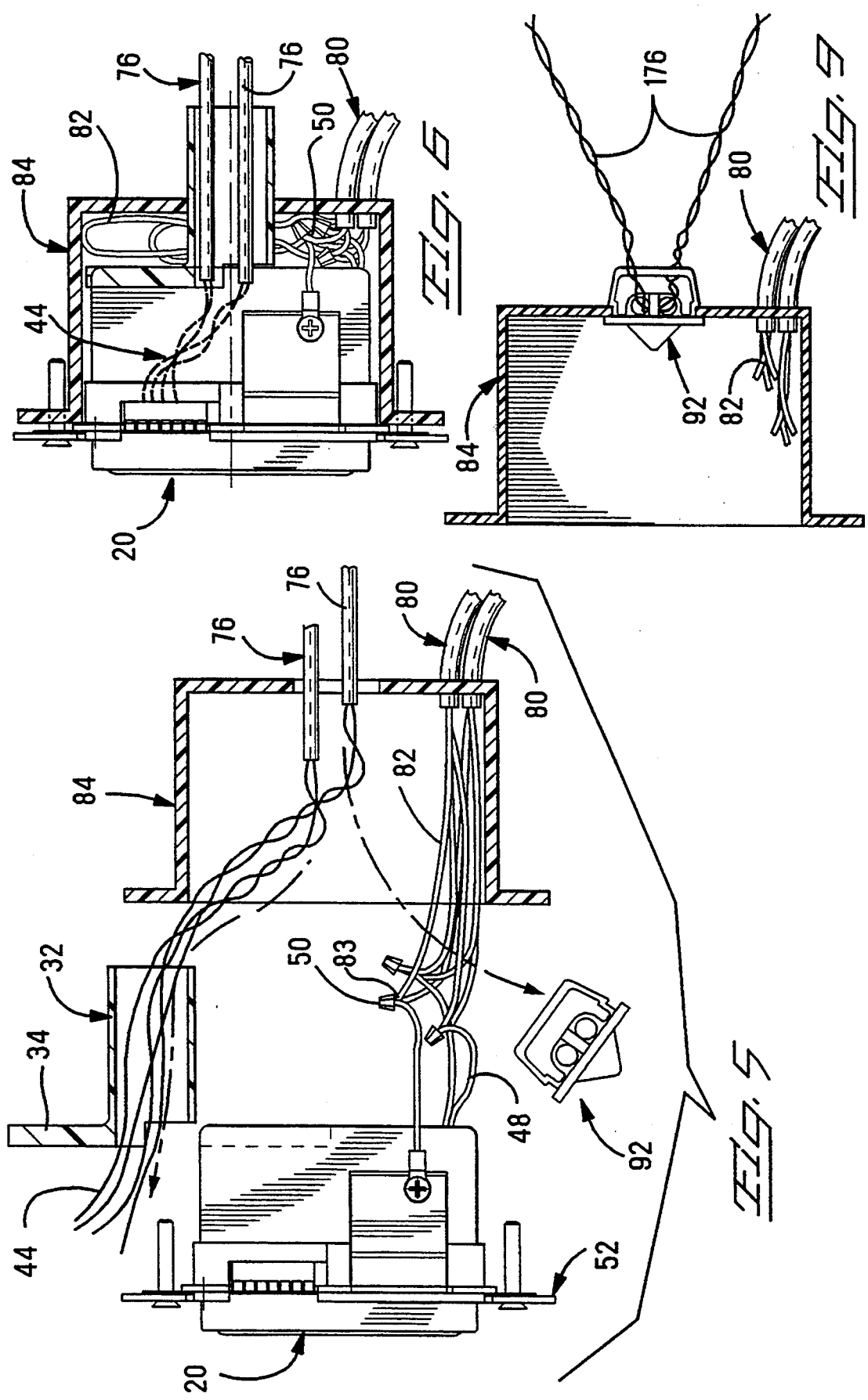

The wiring device 20 includes a housing 22 having a tubular projection 32 mountable to the housing 22 to extend through a knockout opening 86 in an electrical device box 84, as shown in FIGS. 4 through 6. The rocker operated switch has a circuit board 36 with means for connection to low voltage and power connectors 76,82, a mounting strap 52 for mounting the wiring device 20 in an electrical device box 84, a rocker actuator 66 and a bezel 70. Housing 22 has a rear wall 24, opposed side walls 28, and end walls 27, together defining a component receiving cavity 30.

Figure 2:
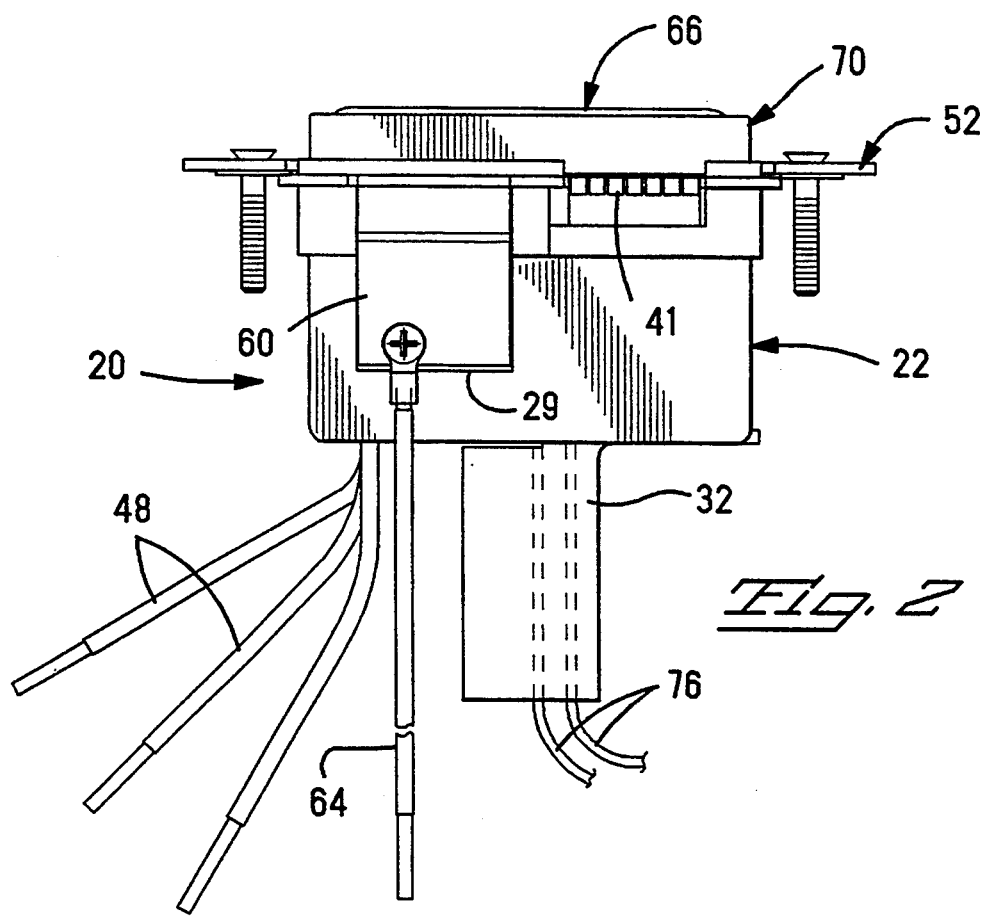
FIG. 2 is a side view of the assembled wiring device of FIG. 1.

The circuit board 36 includes opposed major surfaces 38,42. The first major surface includes two buttons 40 defined as standard momentary printed circuit board switches or key switches and further electrical components 41. Extending rearwardly from the second major surface 42 are a plurality of signal conductors 44, each having an electrical contact in the form of a ring tongue terminal 46, terminated thereto and a plurality of power conductors comprising wire leads for connection to exposed ends 83 of corresponding conductors 82 in power cables 80 which extend into the wall mounted box 84. In assembling the device 20 as shown in FIGS. 2 and 3, the first group or signal conductors 44 are passed through an opening 26 in the rear wall 24 of housing 22, and connected to terminals 46 with screws 47 or other conventional means as known in the art. When used with the ring terminals 46 the screws 47 are loosened and the wire leads 77 of the signal wires are secured to the back of the box. The power conductors 48 extend through respective openings 27 at the bottom of the rear housing wall 24 and are separated from the power limited conductors 44, as required by the NEC.

In the preferred embodiment of this invention, the first connection element for terminating the signal conductors 44 comprises the ring tongue terminal 46 and screws 47. This permits a simple field operation in which the insulation is removed from a portion of the wires and secured between the screw and the ring tongue terminal. A portion of the insulation can be removed from a continuous conductor and secured to the first connection element without cutting or interrupting the conductors. No special tools are required. Alternatively, the separate conductors can be joined to the first connection element to form a continuous conductor, or in some cases it will only be necessary to connect the end of individual wires to the first connecting element. Although the use of screw terminals does have certain advantages, other embodiments can employ different interconnections of the signal conductors to the wiring device 20. For example, poke-in terminals can be employed. Alternatively electrical connectors such as punch down blocks having insulation penetrating slotted beam terminals can be employed. Telephone plug and jack connectors can be used as well as electrical connector receptacles and headers can be used. Each of these connection elements do, however, have their own distinct advantages, and can be substituted provided limitations, such as space, cost and installation difficulty permit the use of the particular connection element embodiment for a specific application.

In the preferred embodiment, the second connection element for attaching the power conductors 82 to the wiring device 20 comprises the wire leads 48 and conventional wire terminals such as wirenuts. This approach is used with conventional dimmer switches and is widely used and accepted by electricians. A number of other equivalent connection elements can be employed, such as crimp splices and poke-in terminals or screw terminals mounted on the wiring device.

Tubular projection 32 is mountable to the rear wall 24 of the housing 22 such that projection 32 is in communication with first electrical connection elements 46. The tubular projection 32 and plate 34 are then secured to the back of the box shown as a sliding motion in FIG. 3.

The class 2 or 3 conductors 76 are fed through the tubular projection 32 from the rear of box 84 and interconnected by conventional means to first connection elements 46, which are exposed on rear wall 24 of housing 32. Tubular projection 32 is then mounted into position on rear housing wall 24 thereby providing a barrier between the first or power limited conductors and the power conductors 82.

Mounting strap 52 includes apertures 54 for securing the strap 52 to the box 84, a plurality of apertures 56 corresponding to the key switches 40 on the circuit board 36 and a plurality of apertures 58 for securing the component assembly 20 together as shown in FIG. 2. The rocker arm 66 includes rocker pivot portion 67 extending from the sides thereof and piston actuators on the rear of the rocker (not shown) that engage the key switches 40 of the circuit board 36 when the rocker arm 66 is activated. The bezel 70 includes slot 74 for receiving the pivot extension 68 of the rocker arm and apertures 72 for securing the components in housing 22.

Figure 7:
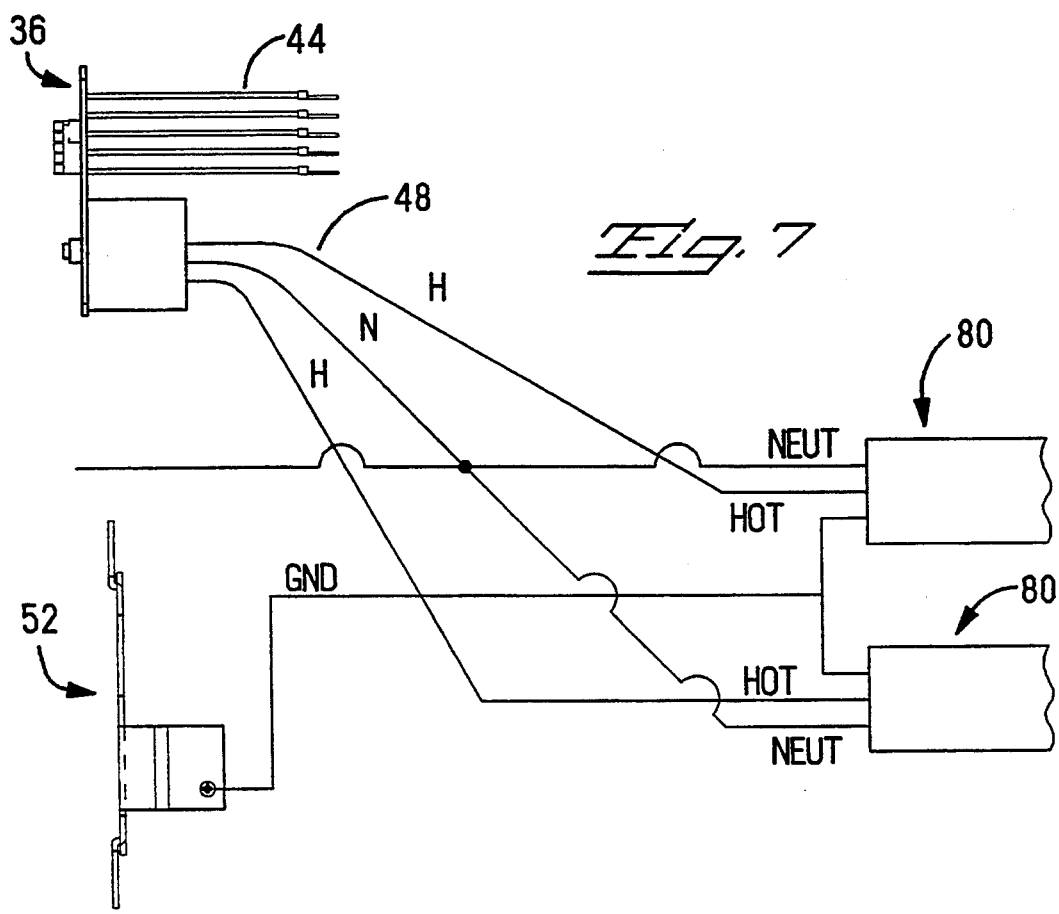
FIG. 7 is a schematic representation of the electrical connection between the power conductors and the device of the present invention.

FIG. 4 illustrates the conventional wire mounted box 84 mounted in the wall having power conductors 80 entering the conventional box 84 and the conventional device disconnected from the conductors 82 in preparation for upgrading with a smart device. In accordance with the invention a wire management knockout closure 92 extending through the rear wall of the box having signal wires 76 attached thereto and secured for later upgrading to the wiring device of the present invention. FIGS. 5 and 6 illustrate the assembly of the device of the present invention and upgrading of the system whereby the wire management knockout closure 92 is pulled into the box thereby pulling the low voltage cable 76 inside for feeding through the tubular projection 32 and for interconnection to respective connecting portions 46 at the rear of the box or housing 22 as previously described and illustrated in FIG. 3. The power conductors 82, which are present in the box when the standard device was mounted, are secured to the respective power conductors as shown schematically in FIG. 7. A ground wire 64 is secured to the side of the mounting strap 52 and connected to the corresponding ground wires of the two cables 80 with the second connection element, shown as wire nut 50, the respective neutral wires are connected with another wire nut 50 and the respective hot wires and switched hot wire are connected with other wire nuts 50.

The assembled and wired device 20 is inserted into the box such that the projection 32 extends through the knockout opening 86 in the rear wall 85 of box 84 and the power wires 82 of cable 80 are pushed into the rear of the box. As can be seen in this figure, the wall box 84 is crowded and the power wires 82 occupy much of the available space. As with conventional installations, it is always difficult to control the positioning of these wires in the box. This figure further illustrates the problem solved by the present invention. The projection 32 provides a barrier between the signal and power wires as illustrated in FIG. 6.

Figure 8:
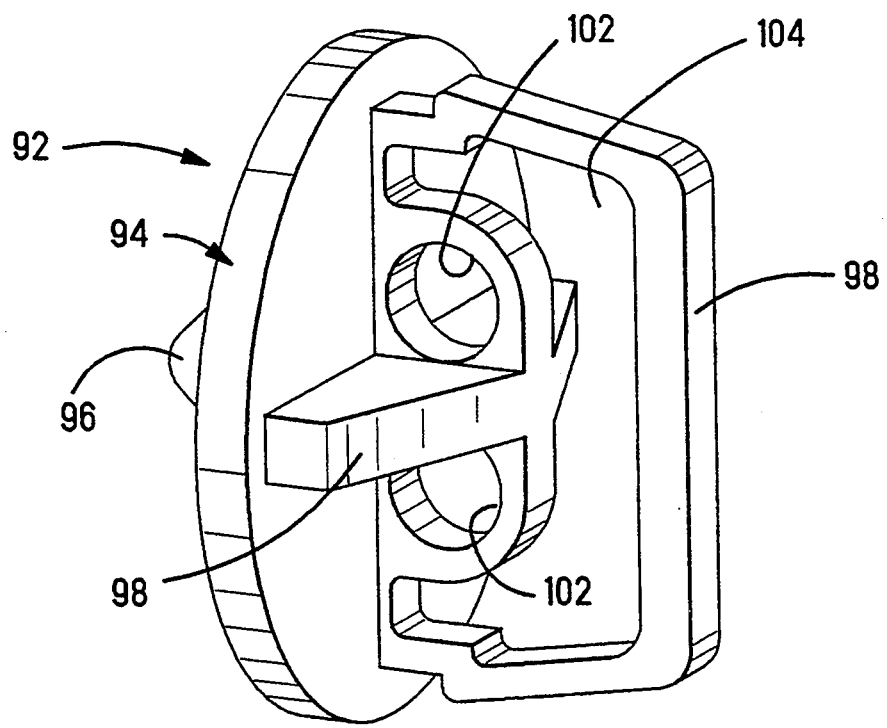
FIG. 8 is a perspective view of the signal wire holding wire management knockout closure used to prewire a conventional box.

FIG. 8 shows a representative wire management knockout closure in accordance with the invention used to secure the low voltage or class 2 or class 3 wires at the rear of the conventional box when the initial building wiring is done and the box 84 is used with a conventional device. The details of the wire management knockout closure are more fully described in U.S. patent application Ser. No. 08/303,984, filed in the name of inventor James L. Dale filed concomitantly herewith. The wire management knockout closure 92 includes a body 94 having a portion 96 for gripping the wire management knockout closure from the interior of the box to pull the wire management knockout closure with the adjoined wires into the box for electrical connection to the upgraded device. The opposite side of the body includes outwardly extending walls having apertures and slots therein for receiving individual wires or cables or the like of the class 2 and class 3 wiring.

FIG. 9 shows an alternative embodiment of the conventional device wherein the low voltage wires are individual twisted pairs 176 rather than a cable.

As can be seen from the foregoing description the present invention provides a means whereby a housing can be prewired and then upgraded at a later time to provide greater capability wherein the low voltage and power wires remain isolated from on another.

It is thought that the wiring device of the present invention and many of its attendant advantages will be understood from the foregoing description. It is apparent that various changes may be made in the form, construction, and arrangement of parts thereof without departing from the spirit or scope of the invention, or sacrificing all of its material advantages.

I claim:

1. A electrical wiring device including:
   a first electrical connection element for interconnection to conductors in a first group, the first group comprising power limited Class 2 or Class 3 conductors;
   a second electrical connection element for interconnection to conductors in a second group, the second group comprising electric light, power, Class 1, or nonpower-limited fire protection signaling conductors;
   a mounting strap for mounting the wiring device in an electrical device box having an opening extending through the rear face of the electrical device box;
   a housing, the first electrical connection element being located in the housing;
   a tubular projection mountable on the housing to extend through the opening in the electrical device box when the wiring device is mounted in the electrical device, the tubular projection communicating with the first electrical connection element so that the conductors in the first group can be fed through the tubular projection from the first electrical connection element to the exterior of the electrical device box, the second electrical connection element being on the exterior of the tubular projection so that the tubular projection separates the conductors in the first group from the conductors in the second group.

2. The electrical wiring device of claim 1 wherein the tubular projection comprises a barrier between the conductors of the first group and the conductors of the second group.

3. The electrical wiring device of claim 1 wherein the tubular projection is detachable from the housing.

4. The electrical wiring device of claim 3 wherein the tubular projection is part of a detachable cover.

5. The electrical wiring device of claim 4 wherein the detachable cover extends over the first electrical connection element.

6. The electrical wiring device of claim 1 wherein the first electrical connection element comprises a plurality of electrical terminals for terminating a plurality of conductors of the first group to the wiring device.

7. The electrical wiring device of claim 6 wherein the electrical terminals comprise screw terminals.

8. The electrical wiring device of claim 1 wherein the second electrical connection element comprises at least one wire lead extending from the housing on the outside of the tubular projection.

9. The electrical wiring device of claim 8 wherein the second electrical connection element comprises wire leads for attachment to external hot, neutral and ground wires.

10. The electrical wiring device of claim 9 wherein the second electrical connection element comprises twist-on type wire connectors for attaching each lead to a corresponding external wire.

11. A electrical wiring device including:
    a first electrical connection element for interconnection to signal conductors;
    a second electrical connection element for interconnection to power conductors;
    a mounting strap for mounting the wiring device in an electrical device box having an opening extending through the rear face of the electrical device box;
    a housing, the first electrical connection element being located in the housing; and
    a tubular projection mountable on the housing to extend through the opening in the electrical device box when the wiring device is mounted in the electrical device, the tubular projection communicating with the first electrical connection element so that signal conductors can be fed through the tubular projection from the first electrical connection element to the exterior of the electrical device box, the second electrical connection element being on the exterior of the tubular projection so that the tubular projection separates the signal conductors from the power conductors.

12. A wiring device for mounting in a wire-receiving device box, said wiring device being adapted for electrical interconnection of wires carrying electrical power to respective conductors of another electrical device, said device being activated by a signal transmitted over low voltage wires from a remote device, said wiring device further comprising:
    a body including a rear face;
    a plurality of first electrical contacts within said body adapted for interconnection to said power wires; and a plurality of second electrical contacts adapted for interconnection to said low voltage wires;

said body including a barrier for isolating said low voltage wires from said power wires, said barrier being in the form of a tube adapted for receiving end portions of said low voltage wires and extending from said rear face of said body and passing through a tube receiving aperture of said device box upon being installed in said device box, whereby when said wiring device is installed in said device box, end portions of said power wires enter said device box at a location remote from said tube receiving aperture and are connected to said first electrical contacts and end portions of said low voltage wires extend through said barrier tube and are connected to said second electrical contacts, said tube providing a barrier between the end portions of said power and low voltage wires.

* * * * *